Patented Nov. 7, 1933

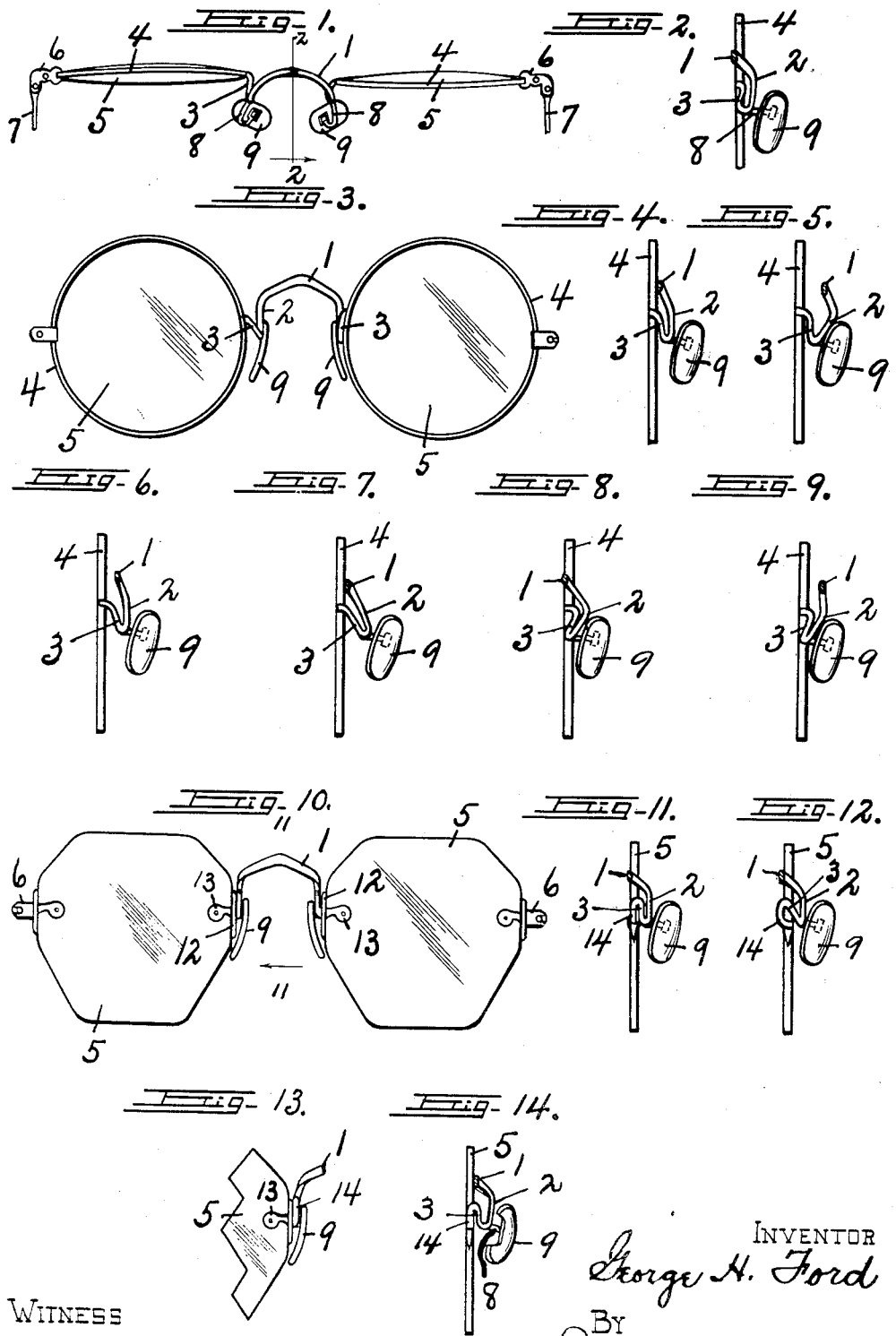

1,934,052

UNITED STATES PATENT OFFICE 1,934,052

SPECTACLES

George H. Ford, Geneva, N. Y., assignor to Shuron Optical Company, Inc., Geneva, N. Y., a corporation of New York Application January 25, 1932. Serial No. 588,703

4 Claims. (Cl. 88—43)

This invention relates to certain new and useful improvements in spectacles.

It is recognized that in spectacle construction, rigid bridges with permanently adjusted nose pad supports thereon are in large demand as compared with the well-known saddle type of bridge which rests upon the nose for the reason that with the former type, a reasonable amount of adjustment to practically meet all conditions can be obtained with relatively few standard sizes. For illustration, five different widths or five frames having different distances between the lenses have been ordinarily stocked.

However, from the standpoint of appearance and effectiveness, it has become desirable and, from a commercial standpoint, quite necessary to provide frames with bridges in three different positions known as "inset", "on plane" and "outset". This requirement or these various arrangements of the bridge provide for the fact that the lenses should be at a constant distance from the eyeball although noses vary substantially in size and form. In other words, if a person has a prominent nose, it may be necessary to wear an "outset" bridge. Other forms and size of nose may require "on plane" or "inset" bridge in order that the bridge may fit as closely as possible to the nose for the sake of appearance if not effectiveness. This naturally multiplies the number of sizes stocked by a multiple of three.

It is sometimes also desirable to move the nose pads in and out and, although ordinary lenses are supposed to be placed at a definite distance from the eyeball, it is sometimes necessary to move them out as, for example, in the case of long eyelashes. Also, it may be desirable to move the pad in and out because of the conformation of a particular nose.

The main object of the present invention is to provide a spectacle frame of the type described which shall be inherently capable of various and many adjustments eliminating the necessity of stocking a large number of spectacle frames having different distances between the lenses, and of stocking of such sizes of frames with bridges located in the three different positions above outlined.

The spectacle frame of this invention provides for various ready and easy adjustments as, for instance, the crest of the bridge can be swung in or out to a desired position to conform with the nose; the pads can be adjusted in and out as well as laterally without effecting the bridge adjustment, and the lenses or the clamps or frames carrying the lenses can be adjusted laterally for pupilary distance without interfering with either of the two previous adjustments. Further, the shape and length of the bridge shank is such that it is easily possible to straighten up the face of the crest of the bridge if necessary, that is, if the bridge is swung back, the inclination of the flat front face will probably be changed, perhaps only slightly, due to the length of the bridge shank herein utilized, but any such change can be easily rectified with this construction.

A further advantage of the construction of this invention is the fact that it is very easy to effect the adjustments described and does not require special tools or special pliers. In fact, although an ordinary pair of optical pliers are desirable for that purpose, they are not required.

Other objects and advantages will appear from the following description taken in connection with the accompanying drawing in which:—

Figure 1 is a top plan view of an embodiment of this invention.

Figure 2 is a section taken on line 2—2, Figure 1.

Figure 3 is an elevation of an embodiment of this invention illustrating a different adjustment than that shown in Figure 1.

Figures 4, 5, 6, 7, 8 and 9 are views similar to Figure 2 illustrating various adjustments readily effected with the construction illustrated.

Figure 10 is an elevation of a rimless spectacle with the invention of this application applied thereto.

Figure 11 is a section on line 11—11, Figure 10.

Figure 12 illustrates a further modified construction.

Figure 13 illustrates, in front view a broken away portion of Figure 10 with the bridge adjusted "on plane".

Figure 14 is a view similar to Figure 11 of the varied adjustment illustrated in Figure 13.

The structure as illustrated in Figures 1 to 9 inclusive, comprises a bridge 1 formed of a non-resilient material such as metal, having sufficient ductility to permit bending in various directions for permanent adjustment and allowing the legs thereof to effect various adjustments such as those above outlined. The opposite legs 2 of the bridge depend downwardly and are return-bent upwardly to form opposed legs 3 which connected at their upper ends to the frame 4 which supports the legs 5, the usual end pieces 6 and temples 7 being provided.

The downwardly extending legs 2 and the opposed upwardly extending legs 3 may be integral continuations of each other and of the bridge, and these legs provide or form an upwardly opening U-shaped section or loop between the bridge proper and the connection of the end of the leg 3 to the frame 4. Normally, the legs of this loop lie in a plane substantially perpendicular to the plane of the lenses, but as hereinafter described, are capable of deflection to provide certain desirable adjustments.

The nose-pad carrying members 8 are likewise formed of non-resilient ductile material such as metal, and like the bridge, although capable of being bent, are permanently positioned in any adjusted position until and unless further adjustment is made. These nose-pad carrying members 8 may also be reversely bent or U-shaped and are connected to the nose pads 9 in any suitable manner.

The nose-pad carrying members 8 are secured to the bridge at the base or closed end of the loop formed by the legs 2 and 3 by soldering or otherwise, and this feature of the particular place of securement is important in the combination. Either leg may be bent in various directions with respect to the other leg without varying the position of the pad supporting member and the pad carried thereby as the closed end of the loop remains in the same position unless both legs are deflected in a manner to shift its position intentionally and thereby shift the nose pad supports.

In Figure 1, it will be noted that the bridge 1 is "inset" or perhaps aproximately "on plane" with the lens 5 for the left eye whereas the bridge 1 is "outset" with respect to the lens 5 for the right eye of the wearer. This relationship of the elements is effected as, for instance, by merely bending the leg 3 of the loop connection for the bridge and lens forwardly about a point near the base of the loop. Such a deflection or bending of leg 3 does not effect any different positioning of the nose pad carrying member 8, but each of the nose pads lie in their normal relative position regardless of the varying adjustments of the two lenses with respect to the "outset", "on plane" or "inset" position of the bridge.

In Figure 3 the same structure is illustrated, but it will be apparent that the lens at the left of the figure has been moved out away from the bridge so as to provide an asymetrical pupilary distance. This adjustment of either of the lenses to a required distance does not affect in any way the normal positioning of the pads due to the fact that the pad-supporting members are connected to the base of the loop or U-shaped section where substantially no movement takes place due to the deflection of either end of the loop.

Figures 4 to 9 inclusive illustrate the same construction as hereinbefore described but show various adjustments of the same. In Figure 4, the bridge may be said to be "on plane" while the nose pads are normal. In Figure 5, the bridge is "inset" and the pads remain normally positioned. In Figure 6, the bridge is "inset" and the pads are "inset". By moving the entire loop in Figure 7, the bridge is "on plane" and the pads are "inset". In Figure 8, the bridge is "outset" and the pads are "outset". In Figure 9, the bridge is "inset" and the pads are "outset".

It will be noted that by connecting leg 3 to the lens-supporting member at some distance above a horizontal line extending across the center of the lens that an upwardly opening U-shaped loop of considerable length can be provided without the base of the loop extending below such horizontal line. This feature has substantial advantages in that the proper place for the approximate middle of the nose-pad and the pad arm is opposite the center of the lens in a vertical direction, and as it is desirable to have the pad arm 8 extend directly back from the bottom of the U-shaped loop, the most desirable and effective positioning of the pad is had when the base of the U-shaped loop lies approximately in line with the center of the lenses in a vertical direction.

Further, it will be noted that the leg 3 of the U-shaped loop is bent forwardly at its upper end where it is attached to the lens support.

This is an important feature of the invention in that it permits a four-way adjustment of the lens-support with respect to the bridge, viz: it may be moved forward or backward and also to the right or left because the shank of the bridge will swing by the lens-support or the lens in any of these four cases.

Figure 10 illustrates this invention as applied to a rimless spectacle which necessitates the connection of the bridge to a lens clamp rather than to a lens frame. With the use of a lens frame, it is possible to connect the end of the leg 3 to the frame above the center of the lens or the center of the frame, but in connection with rimless spectacles, it is desirable to connect the end of the leg 3 to the center of the shoe 12 of the lens clamp 13 and for that purpose as best illustrated in Figure 11, the leg 3 is continued and is turned downwardly to form a reversely arranged loop between leg 3 and its continuation 14 which opens downwardly, the end of the continuation or leg 14 being secured to the center of the shoe 12. Any and all of these connections may be made in any suitable manner as by soldering or the like.

With this construction, the upwardly opening loop or U-shaped section between legs 2 and 3 is retained and utilized, and the distinction exists only in the additional leg 14 which is reversely bent to provide an additional loop which opens downwardly.

Figure 12 illustrates an alternative construction in which the shank of the bridge extends forwardly from its point of attachment to the lens frame.

Figure 14 shows an adjustment in which the bridge is "inset" and the pad is in normal position.

The adjustments shown in the various figures of the drawing are only illustrative, as the construction lends itself to innumerable adjustments both between and beyond the limits illustrated, and perhaps in various directions unillustrated, but it will be apparent that without moving the nose pad or nose pad supporting member, it is possible to swing the bridge forward and backward.

It is also possible to bend the arm 3 of the loop from the end where it is attached to the lens frame to thereby move the pad supporting arm and its pad in and out. This will, in most cases, also move the bridge crest which can, by another adjustment, be readily positioned wherever desirable. Further, it is also possible to adjust each lens or lens supporting member laterally independently of the bridge and of the pad supporting member, and without affecting the adjustment of the latter members. Substantially universal adjustment of the lens rims or clamps is possible with respect to the bridge and pad supporting members and independently of each other so as to position the bridge where required with respect to the lenses and to position the pads where required with respect to each other and the bridge and the lenses, and to move the lenses or lens clamps laterally to effect any desired adjustment with respect to the bridge and independently of each other.

I claim:

1. A spectacle comprising a substantially rigid ductile bridge having its legs formed in upwardly opening substantially vertical U-shaped portions normally in a plane substantially at right angles to the plane of the lens, lens securing members connected to the outer ones of the respective legs beyond the U-shaped portions, the lower ends of the U-shaped portions being on approximately the horizontal median lines of the lens and substantially rigid ductile nose pad supporting members secured to the legs at the base of the U-shaped portions.

2. A spectacle comprising a substantially rigid ductile bridge having shanks formed with depending reversely bent U-shaped portions providing upwardly opening loops normally in a plane substantially at right angles to the plane of the lens, lens securing members connected to the outer terminal ends of the loops and substantially rigid ductile nose pad supporting members secured to the shanks at the base of the loops and the lower ends of the U-shaped loops being on approximately the horizontal median lines of the lenses.

3. In a spectacle, a lens supporting member, a bridge, an upwardly opening U-shaped loop member having front and rear legs, the front leg being attached to the lens supporting member and a rear leg connected to the bridge and a pad supporting arm attached to the bottom of said loop and extending therefrom in the general plane of the loop.

4. In a spectacle, a lens supporting member, a bridge, an upwardly opening U-shaped ductile non-resilient member having one of its legs attached to the lens supporting member and its other leg secured to the bridge, and a pad supporting arm attached to and extending from the U-shaped member at the outer side of its closed end.

GEORGE H. FORD.